March 1, 1949.   R. O. YOUNG   2,463,075
TORCH HOLDER FOR CUTTING OPENINGS
Filed Jan. 3, 1944
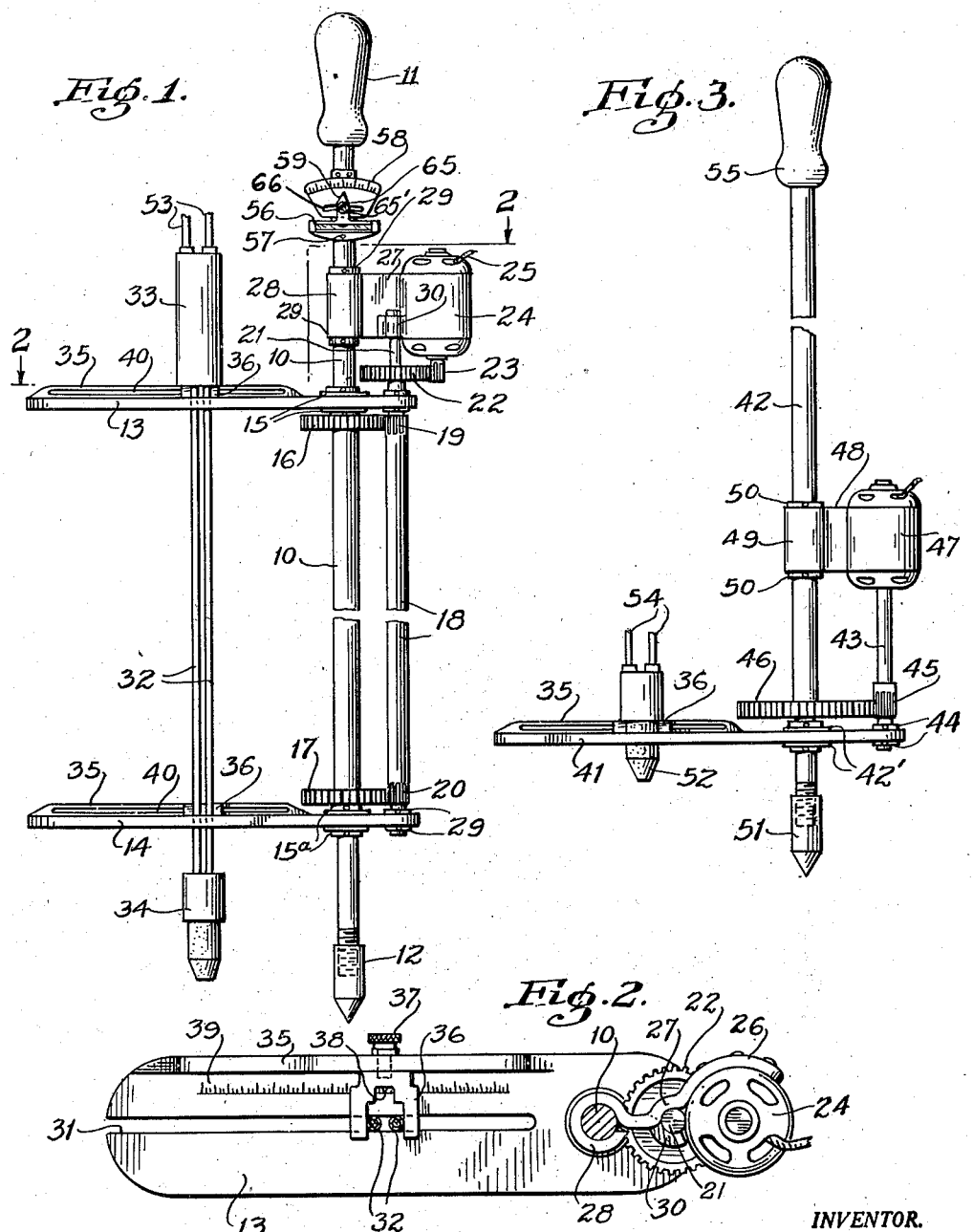
INVENTOR.
Roy O. Young,
BY Carlos G. Stratton
ATTORNEY.

Patented Mar. 1, 1949

2,463,075

UNITED STATES PATENT OFFICE 2,463,075

TORCH HOLDER FOR CUTTING OPENINGS

Roy O. Young, Bell, Calif.

Application January 3, 1944, Serial No. 516,893

5 Claims. (Cl. 33—27)

The present invention relates generally to devices for holding cutting torches in a manner adapting the same for use in cutting openings by movement of the torches in a circular path, and has for its primary object the provision of a device of this type which is readily and freely portable and may be used in a manner insuring the cutting of openings with side walls parallel to the axis of the opening and uniformly even and regular throughout.

One of the disadvantages of previous portable torch holders is the difficulty in maintaining the supporting upright or staff in a position perpendicular with respect to the work and at the same time rotating the same slowly and uniformly throughout the cutting operation. Both maintenance of the support and rotation thereof are accomplished manually and each suffers from the necessary care which must, or should, be accorded the other.

It is, for the above reason, proposed to provide a torch holder, the supporting upright or staff of which remains stationary throughout the cutting of an opening and the torch holding element or elements of which may be caused to revolve about the staff in a slow, steady and uniform manner, permitting the operator to confine his entire attention to the position of the staff.

The nature of the invention, its further objects, the construction, combination and operation of its parts, and its resulting advantages, may be readily understood and thoroughly appreciated in the course of the following description in detail thereof, and by reference to the accompanying drawings illustrating certain forms of the invention thought, at this time, to best adapt the same to practical use.

In the drawings, which forms a part of this specification,

Fig. 1 is a side elevation showing the invention as applied to the support and control of a free cutting torch.

Fig. 2 is a horizontal sectional view, somewhat enlarged, taken substantially on line 2—2 of Fig. 1, and Fig. 3 is a side elevation showing the invention as applied to the support and control of a torch tip.

Referring now to the above figures and particularly to Figs. 1 and 2, there is shown a central supporting upright or staff 10, preferably provided at its upper end with a suitable handle or grip, indicated at 11, and preferably having at its lower end a threaded or otherwise detachably connected, and readily renewable centering point 12.

In Fig. 1 the staff 10 is shown with upper and lower horizontally outstanding or lateral torch holding arms 13 and 14, which are of identical construction, each being journaled at a point adjacent to, and spaced from, its inner end, upon the staff 10, for example between collars 15 and 15a fixed to the staff. There is also shown a pair of gear members 16 and 17 which are fixedly positioned in any suitable manner to the intermediate portion of the staff 10, respectively below the upper arm 13 and above the lower arm 14.

A shaft 18, paralleling the intermediate portion of the shaft 10, has its upper and lower portions journaled through the inner end portions of the arms 13 and 14, and is provided with upper and lower toothed portions or pinions 19 and 20 respectively in mesh with the stationary gear members 16 and 17 of the staff. This shaft 18 is here shown as having an upper extension 21 above the upper arm 13 and provided with a gear member 22 in mesh with the pinion 23 formed on the lower end of the shaft of a small electric motor 24.

The motor 24, to which a flexible wire or current feed line 25 may be extended from any conveniently suitable source of current, is shown as attached to, and supported by, the curved outer portion 26 of a bracket 27 whose inner end 28 is looped to form a bearing on and around the upper portion of the staff 10 between fixed rings 29. The bracket 27 is also shown with a bearing cap 30 into which the upper extremity of shaft 18 extends, to thus form a revolving unit of the bracket 27, motor 24 and shaft 18, adapted to revolve around the staff 10 by reason of the motor actuated rotation of shaft 18 and the reaction of its pinion connection with the fixed gear members 16 and 17 of the staff.

For the above operation it is only necessary that the operator firmly hold the staff 10 in upright position, or rather perpendicular to the work, and against rotation, with its lower centering point 12 in a recess formed with a center punch in the work.

Each of the arms 13 and 14 has a central longitudinal slot 31 of a width to receive the rigid tubes 32 of a cutting torch so that the handle 33 thereof is above the upper arm 13 and the flame tip 34 is below the lower arm 14, according to Figs. 1 and 2. Each arm is also shown with a lengthwise slotted, upright flange 35 along one edge, and with a U-shaped bracket 36 shiftable therealong and its extensions being adapted to embrace the torch tubes 32 in the manner plainly shown in Fig. 2.

Each torch holding bracket 36 may be held in lengthwise adjusted position along its respective arm 13, 14, by means of a clamping-screw 37 threaded through the slot 40 of the flange 35, and each bracket 36 is preferably provided with an indicator 38 arranged to coact with graduations 39 along the arm, so that the brackets 36 of the upper and lower arms may be easily fixed at equal distances from the staff 10 to assure parallelism of the supporting torch.

A spirit level 56 is arranged on the staff 10 so that an operator may maintain the staff in a desired position. The level 56 is pivotally mounted at 57 on the staff 10. By relation to a graduated scale 58 fixedly mounted on the staff, the spirit level mounting may be adjusted the desired amount off the vertical. A pointer 59 on the level indicates the angle of the level off the vertical. A nut 65' on a bolt 65 carried by the pointer maintains the pointer 59 and the level 56 in the desired adjusted position. The bolt 65 is slidable laterally in the slot 66 in the scale plate 58.

In the modified form shown in Fig. 3, a single arm 41 is provided. Pinned to a staff 42, as before, are collars 42' at both sides of the arm 41, to maintain the arm against vertical movement on the staff 42, but permitting swinging movement of the arm around the staff.

Also as in the first-described form, a motor shaft 43 carries rings 44 fixed on the shaft 43. The lower portion of the shaft 43 is toothed at 45 to mesh with a gear 46 mounted in fixed relation upon the staff 42. An electric motor 47 is connected to drive shaft 43. A bracket 48 is fastened to the motor 47 in the manner that the bracket 27 is fastened to the motor 24 (see Fig. 2). The bracket 48 carries a sleeve 49 that is rotatable upon the staff. Collars 50 are pinned on the staff 42 above and below the sleeve 49. A centering point 51 is screwed upon the lower, threaded end of the staff 42.

A flame tip 52 is slidably mounted upon the arm 41. A U-shaped bracket 36 is employed to slidably mount the flame tip 52 upon the arm. Suitable conduits 53 and 54 supply oxygen and acetylene to the tips 34 and 52 respectively. A grip 55 is arranged on the upper end of the staff 42.

In the operation of my present devices, the centering point (12 or 51) is placed at the center of the circle to be described by the flame tip (34 or 52). The distance of the flame tip from the staff (10 or 42) is adjusted relative to the scale 39 on the arms (13, 14 and 41). Then the screw 37 is screwed home to maintain the flame tip in its desired, adjusted position.

The motor (24 or 47) is then started, which causes the flame tip to revolve around the axis of the centering point (12 or 51). It is believed clear that by watching the position of the staff (10 or 42) to see that it is vertical to the work, an operator may insure an even, circular cut with the torch.

While I have illustrated and described what I now regard as the preferred embodiments of my invention, the constructions are, of course, subject to modifications without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. In a device of the character disclosed, a staff having a pointed pivotal support and a fixed gear thereon, spaced arms extending at right angles to and fulcrumed on said staff for carrying a torch means, a shaft parallel with said staff and journaled in the ends of said spaced arms, a motor, means to journal said motor on said staff, means on said journaling means to journal the upper end of said shaft, interacting gear means on the motor and upper end of said shaft to rotate said shaft and a pinion on said shaft engaging the gear on said staff to rotate said shaft and spaced arms orbitally as said shaft is revolved.

2. In a torch holder of the character disclosed, a manually held pivot member having a series of spaced fixed gears, a series of spaced parallel arms fulcrumed on said member for supporting a torch, a shaft in parallel relation to said member, and journaled in the end of said arms, pinions on said shaft meshing with said spaced gears, said shaft having an extension, a gear mounted on said extension, a motor having a pinion to mesh with said last named gear, and a means for journaling said motor on said member.

3. In a torch holder of the character described, a manually held pivot member having a pair of fixed gears, a series of spaced arms fulcrumed on said member for supporting a torch, a shaft in parallel relation to said member journaled in the ends of said arms and provided with pinions to mesh with said fixed gears on said member; and a motor journaled on said pivot member and geared with said shaft to revolve same orbitally relatively to said pivot member.

4. In a torch holder of the character disclosed, a manually held pivot member, a gear thereon, an arm fulcrumed on said member for supporting a torch, a shaft journaled at one end in the end of said arm, a motor connected to the other end of said shaft to drive the same, a pinion on said shaft meshing with said gear to drive said shaft and arm orbitally relatively to said pivot member, and means to journal said motor to said pivot member.

5. In a device of the character referred to, a vertical staff having a handle at the top for manually holding the staff stationary in a perpendicular position, and a pivot member at the lower end, a pair of horizontally disposed spaced arms pivotally connected to said staff near an end thereof for holding a torch, means to secure said arms in spaced relation on said staff, a pair of gears mounted on said staff, a shaft parallel with said staff and journaled at its upper and lower end in the respective ends of said arms, said shaft provided at its respective ends with pinions meshing with the gears on said staff and with an extension, a gear fixed on said extension, a bracket provided with a sleeve for pivotally mounting same on said staff, means to hold said bracket in position on said staff, said bracket having a bearing for the upper end of said shaft extension, a motor carried by said bracket, and a pinion on the shaft of said motor and in mesh with the gear on the extension of said shaft.

ROY O. YOUNG.

REFERENCES CITED

The following references are of record in the file of this patent:

UNITED STATES PATENTS

| Number | Name | Date |
|---|---|---|
| 280,607 | Grant | July 3, 1883 |
| 859,664 | Jottrand et al. | July 9, 1907 |
| 1,176,584 | Madgett | Mar. 21, 1916 |
| 1,348,363 | Kilts et al. | Aug. 3, 1920 |
| 2,190,360 | Howard | Feb. 13, 1940 |